United States Patent
Park et al.

(10) Patent No.: US 10,691,786 B1
(45) Date of Patent: Jun. 23, 2020

(54) USER INTERFACE METHOD CAPABLE OF SURVEY

(71) Applicant: GOODWILLHUNTING, INC., Seoul (KR)

(72) Inventors: Sungyong Park, Seoul (KR); Sunghee Kim, Seoul (KR); Dongwoon Song, Seoul (KR); Jaeyun Jo, Seoul (KR); Jubileeshinhee Oh, Seoul (KR); Yoonjung Bang, Seoul (KR)

(73) Assignee: GOODWILLHUNTING, INC., Seoul (KR)

( * ) Notice: Subject to any disclaimer, the term of this patent is extended or adjusted under 35 U.S.C. 154(b) by 0 days.

(21) Appl. No.: 16/643,704

(22) PCT Filed: Oct. 19, 2017

(86) PCT No.: PCT/KR2017/011593
§ 371 (c)(1),
(2) Date: Mar. 2, 2020

(87) PCT Pub. No.: WO2019/045170
PCT Pub. Date: Mar. 7, 2019

(30) Foreign Application Priority Data

Aug. 29, 2017 (KR) .................. 10-2017-0109157

(51) Int. Cl.
*H04L 29/00* (2006.01)
*G06F 21/36* (2013.01)
*G06F 3/0488* (2013.01)

(52) U.S. Cl.
CPC ............ *G06F 21/36* (2013.01); *G06F 3/0488* (2013.01)

(58) Field of Classification Search
CPC ............ H04L 2209/24; H04L 63/0428; H04L 9/0869; H04L 2209/56; H04L 67/18
See application file for complete search history.

(56) References Cited

U.S. PATENT DOCUMENTS

2014/0298260 A1   10/2014  Abowd et al.

FOREIGN PATENT DOCUMENTS

| CN | 102340600 A | 2/2012 |
| CN | 103391203 A | 11/2013 |
| JP | 2004-139317 A | 5/2004 |

(Continued)

OTHER PUBLICATIONS

International Search Report dated May 18, 2018 for corresponding international application No. PCT/KR2017/011593.

(Continued)

*Primary Examiner* — Ghazal B Shehni
(74) *Attorney, Agent, or Firm* — Hauptman Ham, LLP

(57) ABSTRACT

The present invention provides a user interface method capable of survey, when a lock screen mode is switched to a main screen mode in a mobile device in which an unlock mobile application software capable of survey is installed, including a step of entering the main screen mode, when an input means of the mobile device generates a gesture event corresponding to a directional pattern on a second split screen, wherein the lock screen mode includes a first split screen and a second split screen separately divided from the first split screen, survey content is displayed on the first split screen, and two or more answer screens, each of which includes answer content matched with the survey content, and the directional pattern corresponding to the answer screens is defined and visualized on the second split screen.

16 Claims, 15 Drawing Sheets

(56) References Cited

FOREIGN PATENT DOCUMENTS

| KR | 10-2011-0133511 A | 12/2011 |
| KR | 10-2013-0069151 A | 6/2013 |
| KR | 10-2013-0088984 A | 8/2013 |

OTHER PUBLICATIONS

Korean Office Action for corresponding Korean application No. 10-2017-0109157 dated Sep. 20, 2017.
Korean Office Action for corresponding Korean application No. 10-2017-0109157 dated Nov. 28, 2017.
Korean Decision to Grant Patent dated Dec. 4, 2017, in connection with the Korean Patent Application No. 10-2017-0109157.
Chinese Office Action for corresponding Chinese application No. 201780020979.0 dated Nov. 27, 2019.
[Supportive Materials for Exception to Loss of Novelty] Pollide—Choose Which One is Better, Facebook, Jan. 29, 2017, Retrieved from the Internet<URL:https://www.facebook.com/Pollslide/photos/a.256357388121807.1073741825.256357201455159/256357404788472/?type=3&theater>, in connection with the corresponding Korean Application 10-2017-0109157.
[Supportive Materials for Exception to Loss of Novelty] "Goodwillhunting, Inc. launches voting app. "Pollide"", Internet News "Asia Herald" (https://www.asiaherald.co.kr/news/22150), May 30, 2017, in connection with the corresponding Korean Application 10-2017-0109157.
[Supportive Materials for Exception to Loss of Novelty] App Publication on Google Play on Apr. 28, 2017, in connection with the corresponding Korean Application 10-2017-0109157.
[Supportive Materials for Exception to Loss of Novelty] App Presentation in "GSMA Mobile World Congress—MWC 2017", Barcelona, Spain, Feb. 27, 2017-Mar. 2, 2017, in connection with the corresponding Korean Application 10-2017-0109157.

USER INTERFACE METHOD CAPABLE OF SURVEY

CROSS REFERENCE TO RELATED APPLICATION

The present application is a National Phase of International Application No. PCT/KR2017/011593, filed on Oct. 19, 2017, which is based upon and claims the benefit of priority from Korean Patent Application No. 10-2017-0109157, filed on Aug. 29, 2017. The disclosures of the above-listed applications are hereby incorporated by reference herein in their entirety.

TECHNICAL FIELD

The present invention relates to a user interface method, and more particularly, a user interface method capable of survey.

BACKGROUND ART

A survey is to ask people an identical question and obtain replies in order to investigate the opinions of the people, and is typically performed by distributing a question table of a simple questionnaire with respect to a certain subject in online or offline to receive the replies, or deriving a response result through a wired or wireless phone.

For the conventional survey, a demand survey company has often been asked to do, but a lot of time and cost are required. In addition, if not through the demand survey company, it is difficult and there is a limit that an individual investigates the opinions of people.

In order to derive an efficient and reliable survey result, it is required from the point of view of a consumer of a survey that a survey procedure is simple and takes a low cost, and furthermore, a lot of survey participants have to be secured. In addition, from the point of view of a survey respondent, it is required that responding to the survey is simple so that a respondent can easily participate in, and does not take much time.

On the other hand, quite some time has passed after a smartphone becomes necessities to people all around the world, and according to one demand survey, it is said that the number of times a smartphone user turns on his/her smartphone is an average of 76 times a day. In other words, the smartphone user looks a lock screen by an average of 76 times a day.

The present inventors have completed the present invention through years of research and efforts so that a simple, easy, and highly reliable survey result can be obtained using lock screens of smartphones being in use by all around world.

DISCLOSURE OF THE INVENTION

Technical Problem

The present invention provides a user interface method capable of survey that is very easy, simple, and also capable of investigating opinions of the majority of people beyond national borders.

Besides, other objectives that are not specified in the present invention are additionally considered within the scope of the detailed description and advantageous effects.

Technical Solution

Embodiments of the present invention provide a user interface method capable of survey, when a lock screen mode is switched to a main screen mode in a mobile device in which an unlock mobile application software capable of survey is installed, including a step of entering the main screen mode, when an input means of the mobile device generates a gesture event corresponding to a directional pattern on a second split screen, wherein the lock screen mode includes a first split screen and a second split screen separately divided from the first split screen, survey content is displayed on the first split screen, and two or more answer screens, each of which includes answer content matched with the survey content, and the directional pattern corresponding to the answer screens is defined and visualized on the second split screen.

Before entering the main screen mode, the mobile device can display a cumulative answer result during a preset time, when generating the gesture event.

The cumulative answer result can be derived in real time through a process in which the mobile device extracts answer data corresponding to the gesture event to transmit the answer data to a service server, and the service server accumulates the answer data received from a plurality of mobile devices.

The mobile device can change a plurality number of pieces of survey content and answer content matched with the survey content received from a service server according to a time interval or an answer event occurring in the mobile device to display the changed plurality of pieces of survey content and answer content respectively on the first split screen and the second split screen.

A mark, which is capable of changing the survey content and the answer content matched therewith, can be defined and visualized on the first split screen, and the mobile device can change the survey content and a plurality number of pieces of survey content received from a service server, every time the input means generates a touch event for touching the mark, and display the changed plurality number of pieces of survey content and answer content respectively on the first split screen and the second split screen.

The gesture event can be that the input means slide-touches the directional pattern to any one answer screen among two or more of the answer screens.

The mobile device can display an image corresponding to the survey content on the first split screen together with the survey content or displaying an image corresponding to the answer content on the answer screen together with the answer content.

The lock screen mode can further include: a third split screen separately divided from the first split screen and the second split screen, wherein the mobile device switches the lock screen mode to the main screen mode, when the input means generates a touch event for touching the third split screen.

The mobile device can switch the lock screen mode to the main screen mode, when the input means generates a sliding touch event in a region other than the directional pattern of the lock screen mode.

Other embodiments of the present invention provide a mobile device, in which an unlock mobile application software capable of survey is installed and which displays survey content received in communication with a service server via a wireless communication unit through a lock screen mode and performs an operation of receiving a gesture event input through an input means to transmit answer data to the service server, including: a memory for storing data; and a processor, wherein the processor performs through execution of the unlock mobile application software capable of survey: (a) an operation of composing the lock screen mode with a first split screen and a second split screen separately divided from the first split screen, displaying survey content is displayed on the first split screen, and visualizing two or more answer screens including answer content matched with the survey content on the second split screen, and a directional pattern corresponding to the answer screens; and (b) an operation of controlling to enter a main screen mode, when an input means of the mobile device generates a gesture event corresponding to the directional pattern on the second split screen.

The processor can further perform an operation of displaying a cumulative answer result during a preset time at a time of generating the gesture event, before entering the main screen mode.

The cumulative answer result can be derived in real time through a process that the mobile device extracts answer data corresponding to the gesture event to transmit the answer data to a service server, and the service server accumulates the answer data received from a plurality of mobile devices.

The (a) operation can include changing a plurality of pieces of survey content and answer content matched with the survey content received from a service server according to a time interval or an answer event occurring in the mobile device to display the changed plurality of pieces of survey content and answer content respectively on the first split screen and the second split screen.

The (a) operation can define to visualize a mark capable of changing the survey content and the answer content on the first split screen, and changing a plurality number of pieces of survey content received from a service server and answer content matched with the survey content, every time the input means generates a touch event for touching the mark, to display the changed plurality of pieces of survey content and answer content respectively on the first split screen and the second split screen.

The gesture event can be the input means slide-touches any one among the two or more answer screens, starting from the directional pattern.

The (a) operation can display an image corresponding to the survey content on the first split screen together with the survey content or displaying an image corresponding to the answer content on the answer screen together with the answer content.

The lock screen mode can further include a third split screen separately divided from the first split screen and the second split screen, and the processor can perform, after the (a) operation, an operation of controlling to enter the main screen mode, when the input means generates a touch event for touching the third split screen.

The processor can control to enter the main screen mode, when the input means generates a sliding touch event in a region other than the directional pattern of the lock screen mode.

Advantageous Effects

When using a user interface method capable of survey according to the present invention, it is possible to simply and easily investigate the opinions of the majority of people beyond national borders at a very low cost.

The potential effects expected by the technical features of this patent document but not specifically referred to in the specification would be regarded as the effects referred to in the specification.

Figure 1:
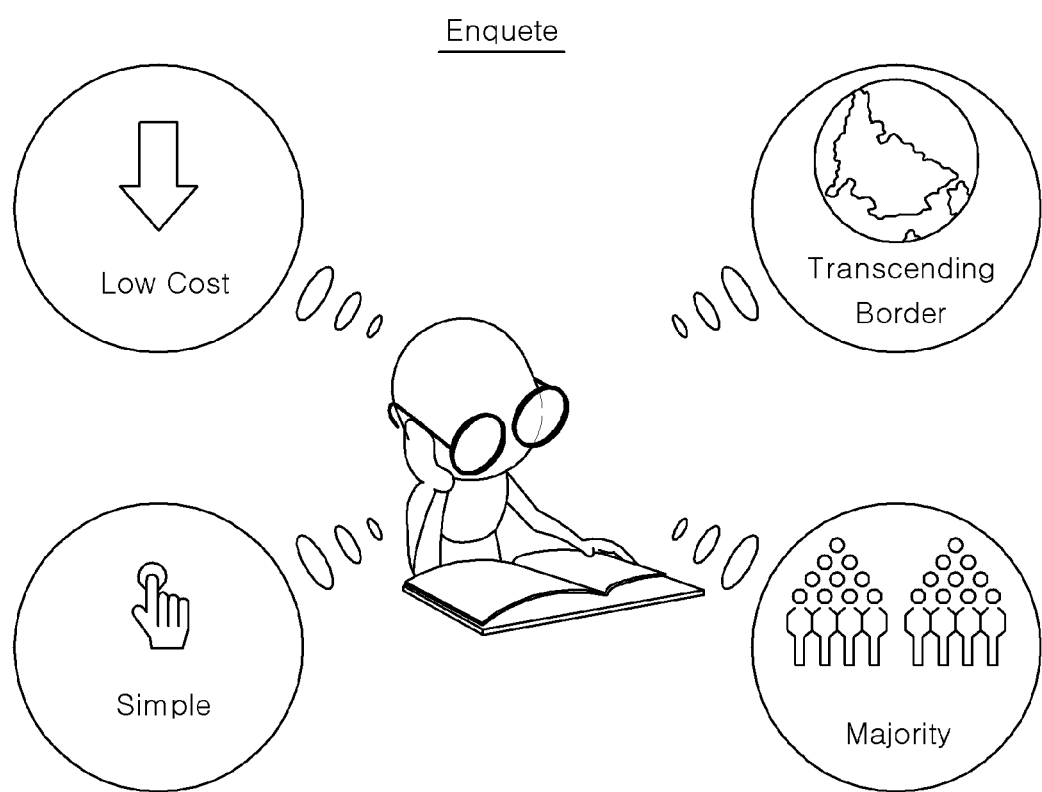
FIG. 1 is a drawing of showing deliberation of the inventors before inventing a user interface method capable of survey according to the present invention.

The accompanying drawings are included to provide a further understanding of the inventive concept, and the scope of the right of the present invention is not limited thereto.

MODE FOR CARRYING OUT THE INVENTION

Hereinafter, detailed description on related known functions will be omitted while explaining the present invention when the known functions are obvious to a person skilled in the art and are considered to unnecessarily obscure the gist of the present invention.

The terminology used herein is for the purpose of describing particular embodiments only and is not intended to be limiting of example embodiments. The singular forms "a," "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

Hereinafter, a user interface method capable of survey according to embodiments of the present invention will be described in detail with reference to the attached drawings, in which like reference numerals designate like elements and repetitive explanations thereof will be omitted.

FIG. 1 is a drawing of showing deliberation of the inventors before inventing a user interface method capable of survey according to the present invention.

As illustrated in FIG. 1, the inventors of the present invention have deliberated on that in a survey, how a consumer of the survey can induce many respondents beyond national borders to participate in the survey through a simple procedure at a low cost, and how a survey respondent can simply and conveniently participate in the survey.

In order to obtain a simple, effective, and highly reliable survey result, the inventors of the present invention have recognized that the survey should be performed simply and conveniently to both of the survey response and the consumer of the survey. Accordingly, the inventors have derived a method for simply and conveniently performing a survey using lock screens of smartphones used by people all around the world.

Figure 2:
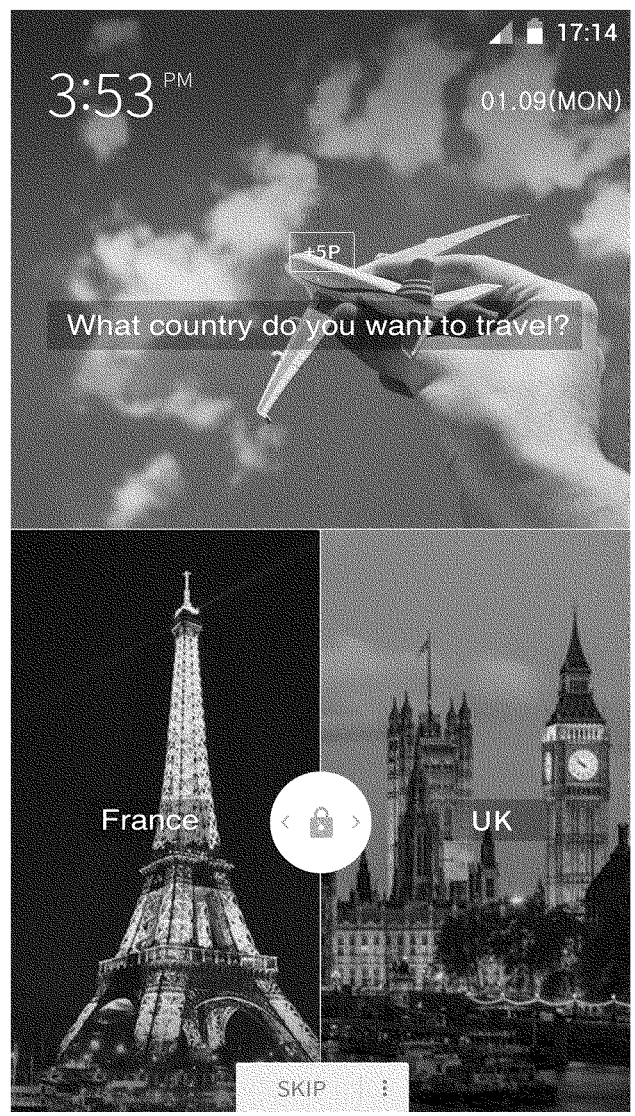
FIG. 2 is a drawing of an actual lock screen of a mobile phone according to a user interface method capable of survey as an embodiment of the present invention.
Figure 3:
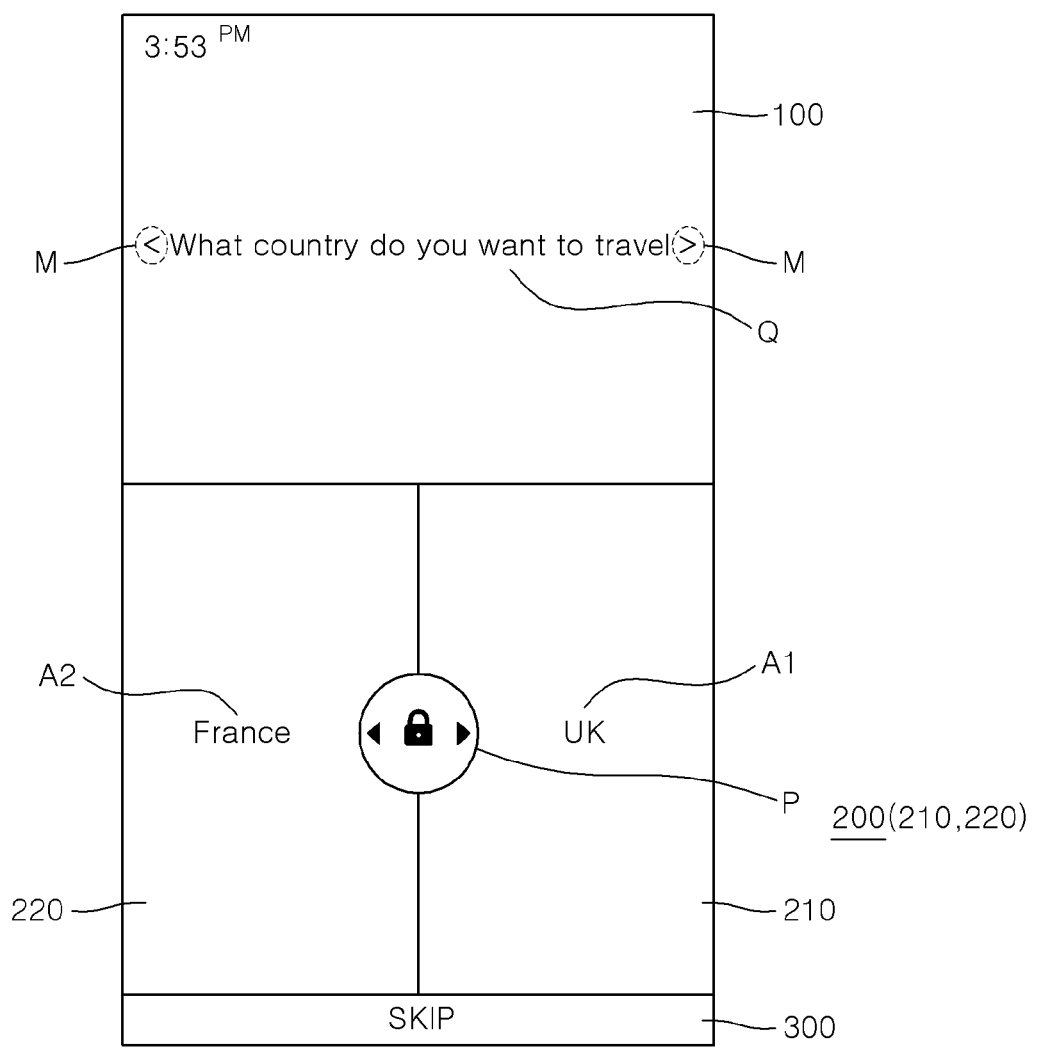
FIG. 3 is a drawing of explaining a configuration of a lock screen according to a user interface method capable of survey as an embodiment of the present invention.

FIG. 2 is a drawing of an actual lock screen of a mobile phone according to a user interface method capable of survey as an embodiment of the present invention, and FIG. 3 is a drawing of explaining a configuration of a lock screen according to a user interface method capable of survey as an embodiment of the present invention.

As illustrated in FIGS. 2 and 3, the present invention uses a lock screen of a mobile device of a user. The mobile device in this case may be any one among a smartphone, a tablet PC, and a wearable device, which executes pre-installed an unlock mobile application software capable of survey.

The user interface method capable of survey relates to a user interface method, when a lock screen mode of a mobile device, in which the unlock mobile application software capable of survey has been installed, is changed to a main screen mode. Typically, when the user does not use the mobile phone and a preset time has elapsed thereafter, the mobile phone enters the lock screen mode. At this point, the user is required to unlock the lock screen in order to change the lock screen mode to the main screen mode.

The present invention allows a scheme of unlocking the lock screen to interact with the survey, and thus the user unlocks the lock screen and participates in the survey at the same time. In other words, when the user participates in the survey, the lock screen is automatically unlocked.

To this end, the lock screen mode of the present invention includes a first split screen 100 and a second split screen 200. The first split screen 100 and the second split screen 200 are separately divided from each other on a display screen of the user.

At this point, survey content Q is displayed on the first split screen 100. In other words, as illustrated in FIG. 2, a question for the survey such as "What country do you want to travel" is displayed.

On the second split screen 200, answer content A matched with the survey content Q is displayed. For example, "France" or "UK" or the like, which matches the above question, can be displayed. Such answer content A is formed in plural, and the second split screen 200 includes a plurality of answer screens 210 and 220 corresponding to the plurality of pieces of answer content A. The plurality of answer screens 210 and 220 are separately divided within the second split screen 200.

For example, a question has two choices, the second split screen 200 is composed of two answer screens, and on the answer screens, different pieces of the answer content A, which are matched with the survey content Q, are displayed. When a question has three choices, the second split screen 200 can be composed of three answer screens, and when a question has four choices, the second split screen 200 can be composed of four answer screens.

With regard to a configuration in which the first split screen 100 and the second split screen 200 are separately divided, or with regard to separation and division of the second split screen 200, the right of the present invention is not limited to embodiments of the present invention. In other words, various separations and divisions are possible.

On the second split screen 200, a directional pattern P is defined and visualized. The directional pattern P can be formed on the border of a plurality of answer screens in correspondence to the answer screens. When a question has two choices and thus answer screens are two, a directional pattern P can be composed of two directions so as to correspond to the answer screens. The directions at this point can be composed of arrows respectively oriented toward the answer screens from the border of the plurality of answer screens.

Then, when an input means of the mobile device generates a gesture event S1 corresponding to the directional pattern P of the second split screen 200, the user participates in the survey and the user's display screen enters the main screen mode at the same time. In other words, when moving (namely, slide-touching) the directional pattern P along the arrow direction, the user unlocks the lock screen and participates in the corresponding survey at the same time.

Figure 4A:
FIGS. 4a, 4b, and 4c show drawings illustrating that a lock screen (FIG. 4a) is changed to a main screen (FIG. 4c) via a cumulative result display screen (FIG. 4b) in a user interface method capable of survey as an embodiment of the present invention.
Figure 4B:
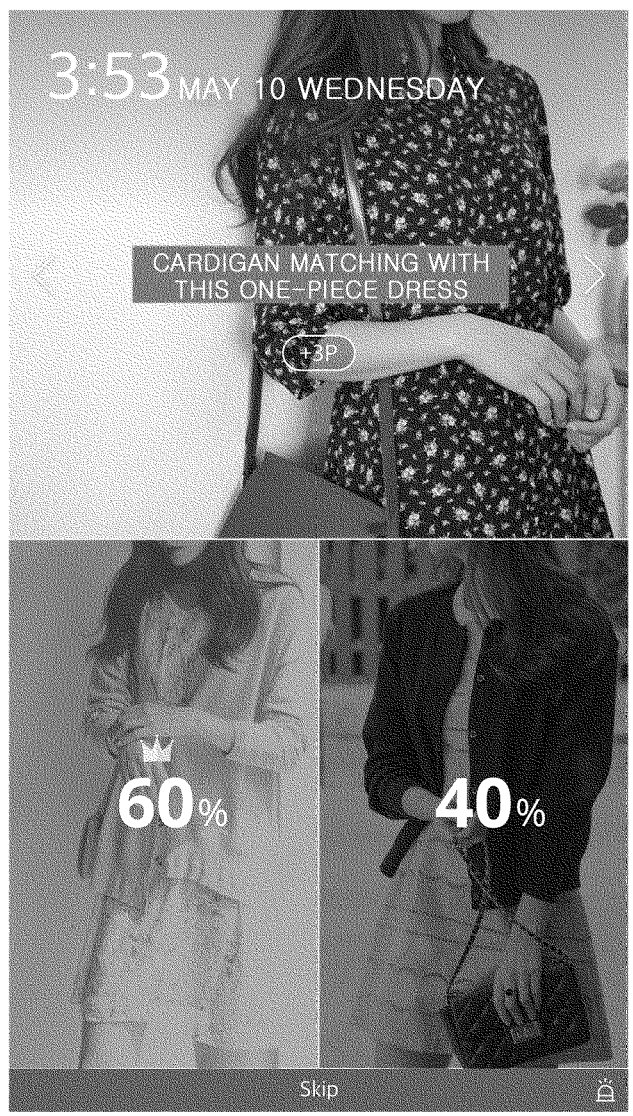
Figure 4C:
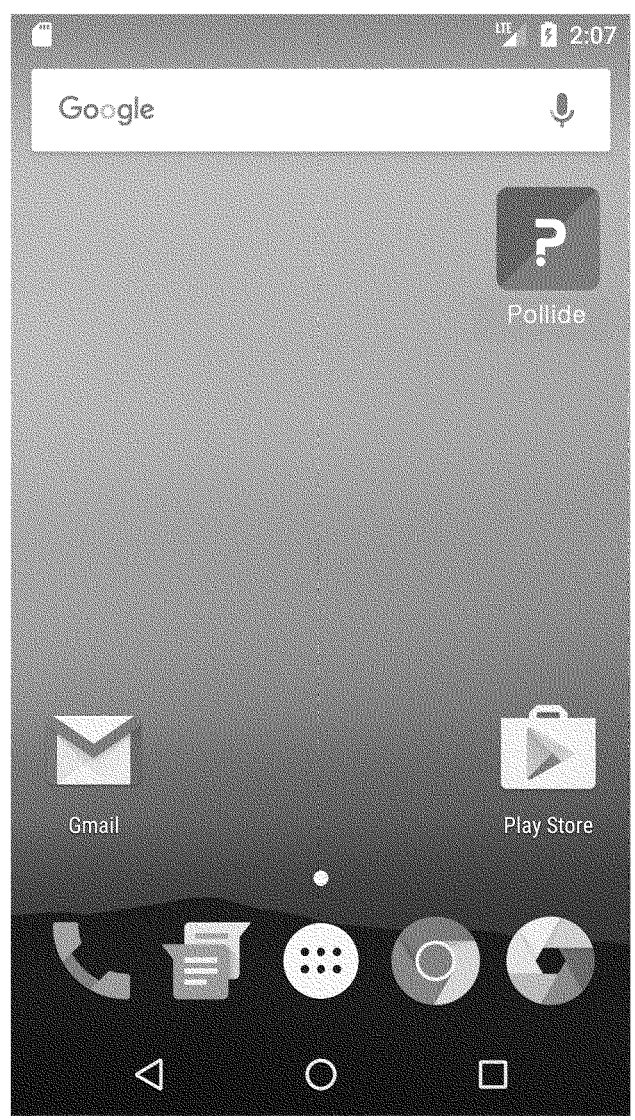

FIGS. 4a, 4b, and 4c show drawings illustrating that a lock screen is changed to a main screen via a cumulative result display screen in a user interface method capable of survey as an embodiment of the present invention.

When a user gesture event S1 occurs in a lock screen mode while the unlock mobile application software capable of survey is executed, the mobile device according to the present invention can display, on a user display screen, a cumulative answer result for a survey question during a preset period, before entering a main screen mode.

FIG. 4a shows the lock screen mode according to the present invention, FIG. 4b shows a cumulative answer result display mode according to the present invention, and FIG. 4c shows the main screen mode. In the lock screen mode, as an answer to a question of the survey content Q such as "a cardigan matching with this one-piece dress", the user performs a gesture event S1 (a sliding touch) for the direction pattern P in a direction of "pure image", a cumulative answer result of the survey from a plurality of users is immediately displayed during a preset time. After the preset time is elapsed, the display automatically enters the main screen mode.

As the preset time, since the user wants to rapidly enter the main screen mode, a time is sufficient for the user to recognize the result through the display screen.

Figure 5:
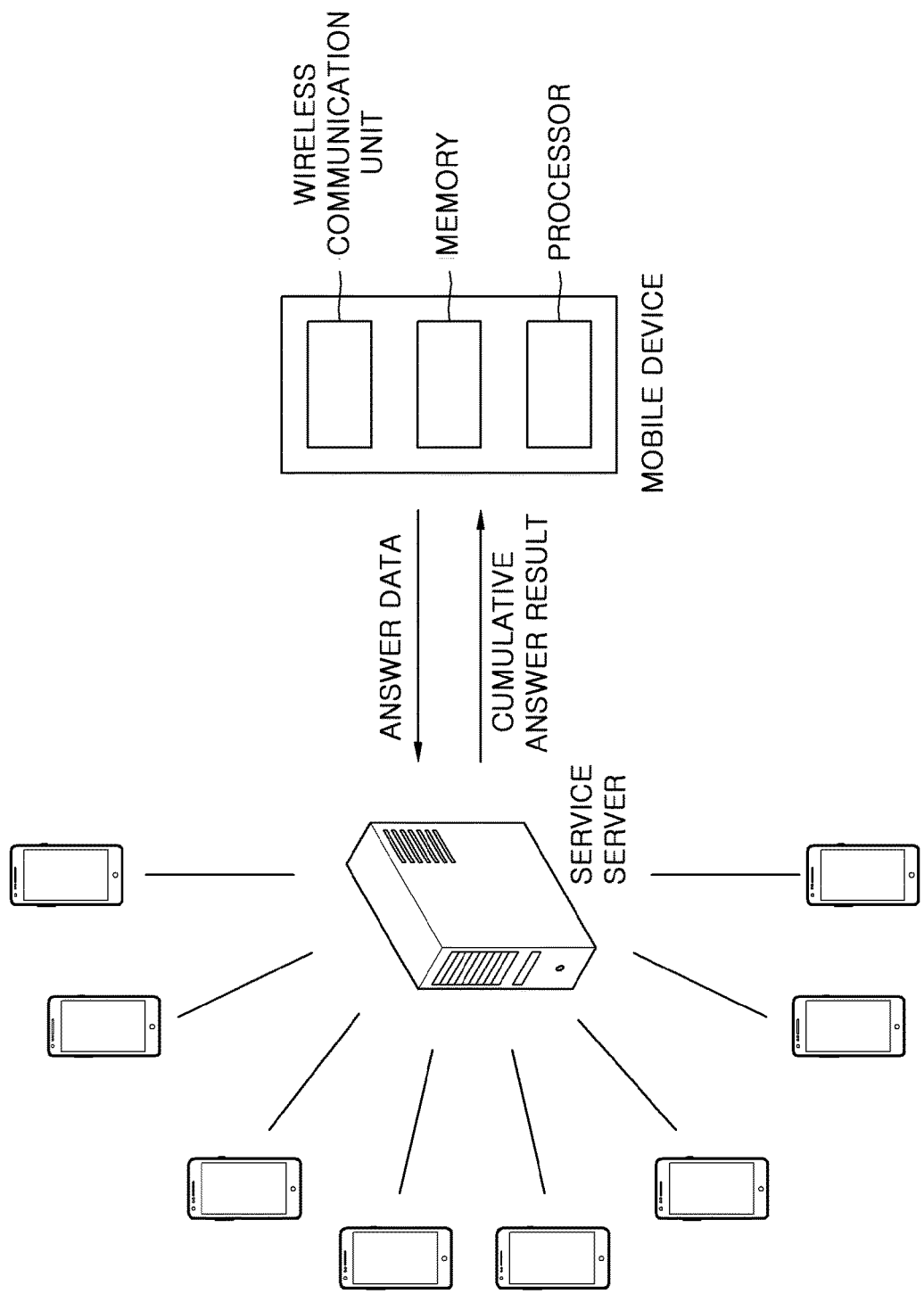
FIG. 5 is a drawing of illustrating transmission and reception of data through wireless communication between a mobile device and a service server as an embodiment of the present invention.

FIG. 5 is a drawing of illustrating transmission and reception of data through wireless communication between a mobile device and a service server as an embodiment of the present invention.

The mobile device according to the present invention can include a wireless communication unit, a memory, and a processor. The wireless communication unit transmits and receives data in communication with the service server in a wireless manner. The memory can temporarily store the survey content Q and the answer content A, and the processor functions to convert the lock screen mode to the main screen mode, when an operation for visualizing the first split screen 100 and the second split screen 200 in the lock screen mode and the gesture event S1 occurs through the input means. At this point, before entering the main screen mode, the cumulative result display screen may be displayed.

As illustrated in FIG. 5, in the mobile device, answer data selected by the gesture event S1 of the user is transmitted to the service server, and the service server accumulates the answer data received from a plurality of mobile devices to derive the cumulative answer result. In other words, the cumulative answer result is derived in real time by accumulating the answer data received from the plurality of mobile devices in each of which the unlock mobile application software capable of survey is installed. Accordingly, the user can compare a self-selection answer with outputs selected by other people.

Through such a configuration, the user can participate in a survey only through a simple unlock operation, and immediately check the survey result.

Such a cumulative answer result can be simply displayed by %, or further specifically displayed by the number of selectors among the total number of survey participants. By displaying the total number of participants, interest and reliability for the present survey can be checked for him/herself.

Various kinds of reward such as scores, etc., can be provided to the user in compensation for participating in the survey. Providing such a reward can attract more survey participants.

On the other hand, the service server can receive the answer data for the survey question from the plurality of mobile devices and accumulates the answer data, and then reuse only the survey result to a desired case. As the unlock mobile application software capable of survey is installed and different users use the same, the answer data is continuously accumulated, and as the number of the users increases, the reliability of the survey result becomes higher and the worth as the survey result becomes higher.

The service server can reuse such a reliability-raised survey result to reproduce the same as a new added value.

The survey content Q and the answer content A corresponding thereto according to the present invention can be continuously changed according to a time interval or an answer event occurred in the mobile device. In other words, when an update is performed so that survey content Q of a survey having been participated once in the lock screen mode is not displayed again, or the survey is skipped without responding thereto, it is also determined that the user does not want to respond to the prior survey content Q after a certain time has elapsed, new survey content Q can be allowed to be displayed.

The survey content Q displayed on the lock screen of the user mobile device can have various survey questions to be randomly displayed, and the user would like to skip a survey according to the kind of the corresponding survey. When the user responds to the corresponding survey, it is preferable that a survey, once having been responded by the user, is not displayed on the screen of the user.

Accordingly, in consideration of such a case in the present invention, the survey content Q is changed after a time interval, or once a response event occurs, corresponding survey content Q is changed. For the survey content Q for which a response event occurs, it can be set so that the same survey content Q is not transmitted to be displayed on a mobile device of a corresponding user.

As described above, when the survey content Q on the first split screen 100 is changed according to a time interval or a response event, answer content A matched with the changed survey content Q is displayed on the second split screen. In other words, when the survey content Q is changed, the answer content A is also changed according thereto.

On the other hand, in the present invention, the survey content Q can be also changed by the user besides a case where the survey content Q is automatically changed according to the time interval or the response event.

Figure 7:
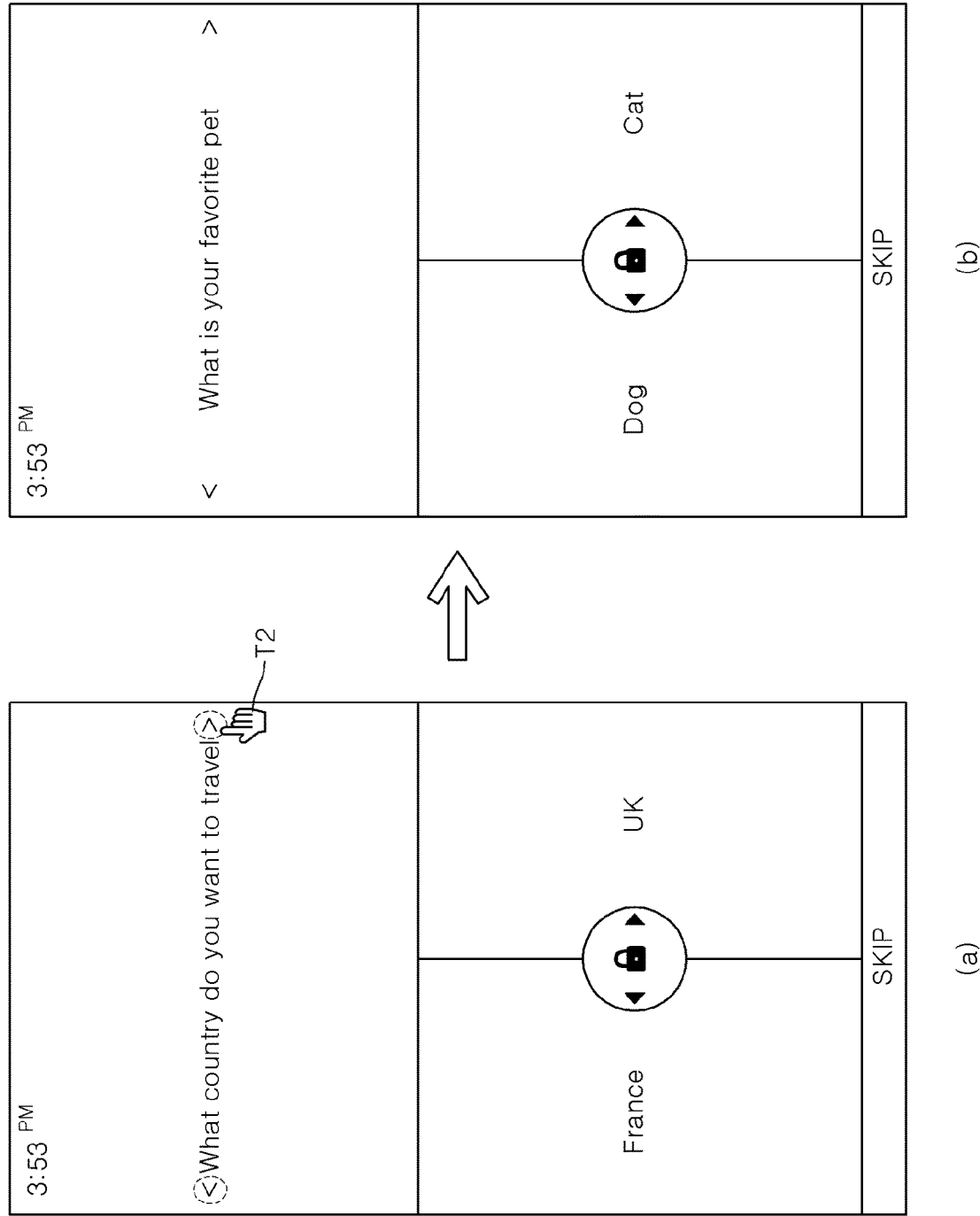
FIG. 7 is a drawing of illustrating that survey content is changed by a mark touch event according to an embodiment of the present invention.

FIG. 7 is a drawing of illustrating that survey content is changed by a mark touch event according to an embodiment of the present invention.

In other words, a mark M, which can change the survey content Q, is defined and visualized on the first split screen of the present invention, and when a touch event T2, in which the user touches such a mark M, occurs, the survey content Q to be displayed on the first split screen 100 can be differed. In other words, the user can skip the survey content Q, which is not desired to answer thereto or for which the answer is ambiguous, and can respond only to a desired survey.

As illustrated in FIG. 7, the survey content Q displayed on the lock screen mode is "What country do you want to travel" and the answer content A matched therewith is "France" and "UK". However, when a touch event of the mark M occurs by the user, the survey content Q and the answer content A can be changed. FIG. 7(*a*) shows the survey content Q and the answer content A before changing, and FIG. 7(*b*) shows new survey content Q after changing. As shown in FIG. 7(*b*), according to the touch event on the mark M by the user, the survey content Q can be changed and displayed from "What country do you want to travel" to "What is your favorite pet", the answer content A corresponding thereto can be changed and displayed from "France" and "UK" to "Dog" and "Cat".

Figure 8:
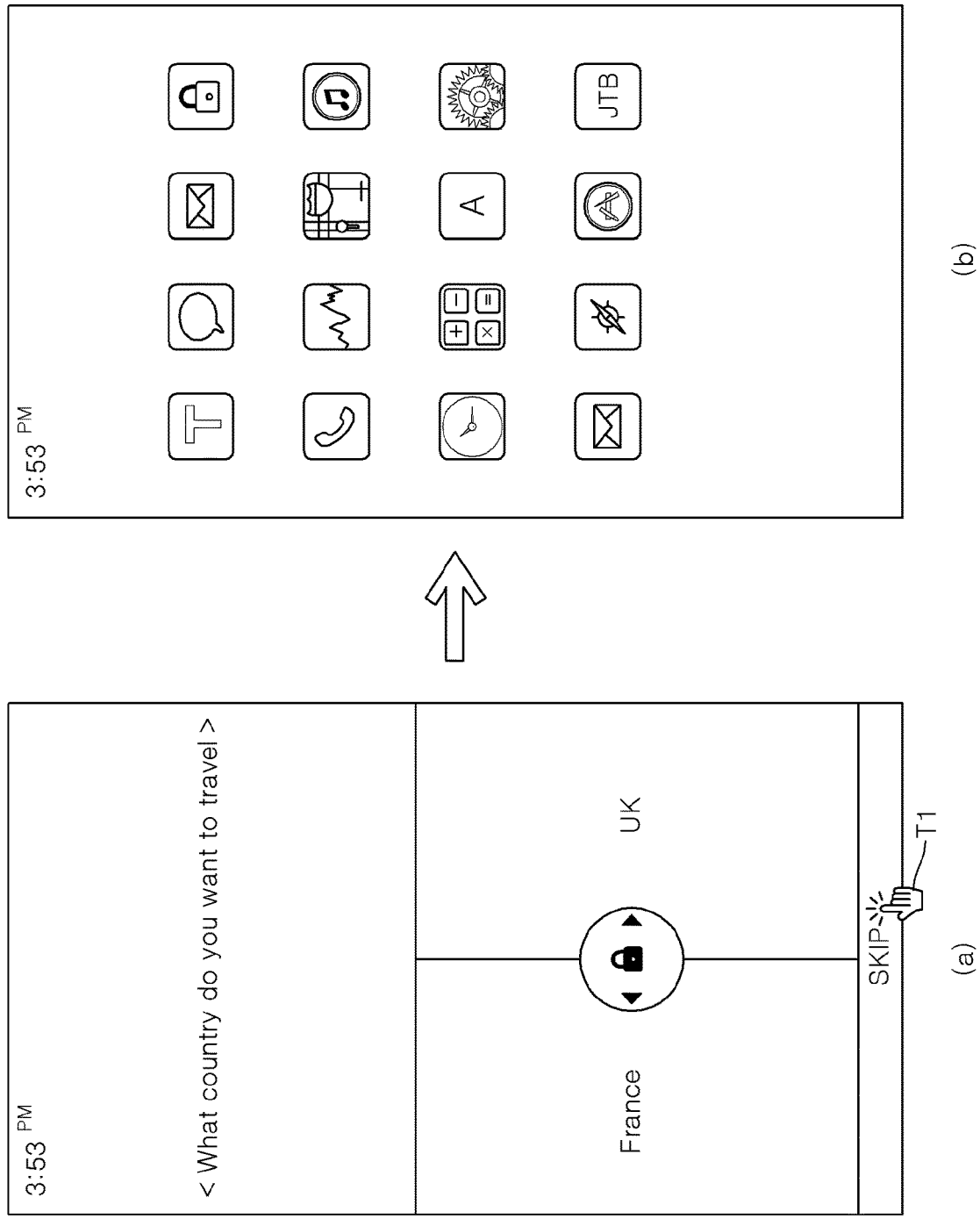
FIG. 8 is a drawing of illustrating that a lock screen is changed to a main screen by a touch event for touching a third split screen according to an embodiment of the present invention.

Although it is shown in FIG. 8 that a survey question having two choices is changed again to a survey question having two choices, it is obvious that the survey question having two choices can be changed to various survey questions having three choices, four choices, or even five choices by means of the touch event on the mark M.

At this point, the mark M can be visualized as less-than symbol or greater-than symbol (<,>) at both sides of the survey content Q. By touching (the touch event T1) the less-than symbol or greater-than symbol at both sides of the survey content Q by means of the input means, the survey content Q displayed on the mobile display screen of the user can be autonomously changed.

When the survey content Q in the first split screen 100 is changed by the touch of the less-than symbol or larger-than symbol, the answer content A in the second split screen 200 is also changed to be matched with the survey content Q. At this point, every time a corresponding touch event occurs, new survey content Q and new answer content A can be received by the mobile device from the service server and displayed on the mobile display screen, or a plurality of pieces of survey content Q are received from the service server and stored in a storage device of the mobile device in advance, and then displayed on the mobile display screen at the time of occurrence of a corresponding event.

Figure 6:
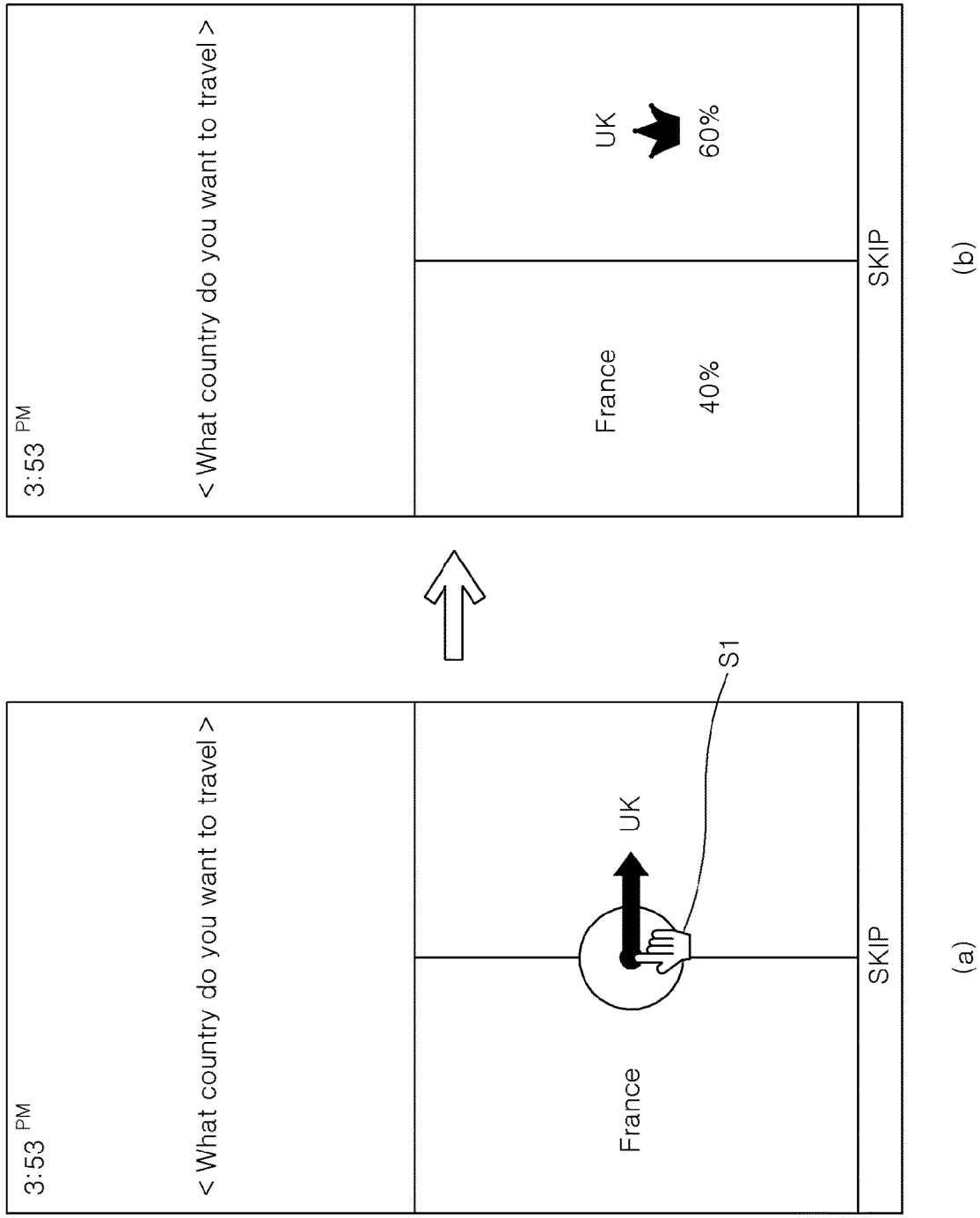
FIG. 6 is a drawing for explaining that a survey result is derived by a gesture event according to an embodiment of the present invention.

FIG. 6 is a drawing of explaining that a survey result is derived by a gesture event S1 according to an embodiment of the present invention. As illustrated in FIG. 6, when the input means of the mobile device touches and holds the directional pattern activated on the second split screen 200, is slid to any one answer screen, and then stops touching, user's survey participation is completed. Such answer data by the user is immediately transmitted to the service server, and the service server accumulates and integrates the received user's answer data and answer data transmitted from a plurality of different mobile devices to derive a cumulative answer result. When the service server transmits the cumulative answer result to the user's mobile device, the mobile device displays the cumulative answer result on the display screen.

As shown in FIG. 6, when the user selects "UK" and a cumulative answer result, which shows that "UK" occupies 60% and "France" occupies 40%, is displayed on the mobile display screen, the user can immediately compare a self-selection with selection results of others.

Figure 9:
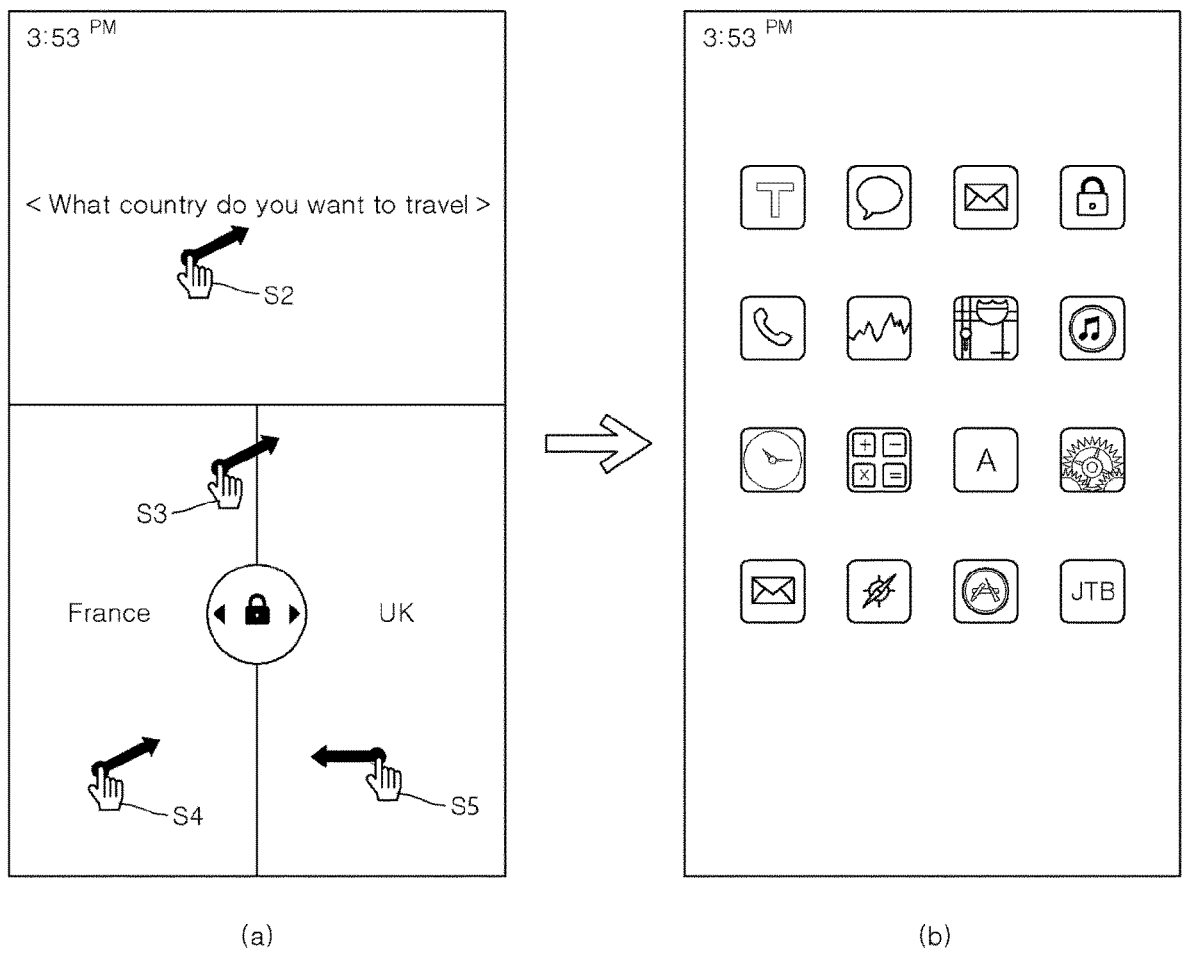
FIG. 9 is a drawing of illustrating that a lock screen is changed to a main screen when a sliding touch is performed in a region other than a directional pattern as an embodiment of the present invention.

FIG. 8 is a drawing for illustrating that a lock screen is changed to a main screen by a touch event in which a third split screen 300 is touched according to an embodiment of the present invention, and FIG. 9 is a drawing for illustrating that a lock screen is changed to a main screen at the time of a sliding touch on a region other than the directional pattern P as an embodiment of the present invention.

FIGS. 8 and 9 show that when a user of the present invention does not want to participate in a survey and wants to directly enter the main screen mode, he or she enters the main screen mode from the lock screen mode by performing a touch on a skip screen or a sliding touch (S2, S3, S4, and S5) on the region other than the directional pattern P.

FIG. 8 includes a separate third split screen 300 in the lock screen mode. The third split screen 300 is separately divided from the first split screen 100 and the second split screen 200, and is displayed on the user display screen. In the third split screen 300, "skip", which indicates a jump to the main screen mode, may be displayed.

When a touch event occurs on the third split screen 300, namely, the skip screen, by means of the user's input means, the lock screen mode can be directly converted to the main screen mode as shown in FIG. 8. The touch event at this point means that the input means contacts and then is detached from the skip screen.

FIG. 9 shows a case where a separate third split screen 300 is not included in the lock screen mode. The user can directly enter the main screen mode by slide-touching (S2, S3, S4, or S5) a region other than the directional pattern P using the input means in the lock screen mode. As illustrated in FIG. 9, the sliding touch (S2, S3, S4, or S5) means that the input means moves a certain distance in a state of contacting the region other than the directional pattern P, and then releases the contact.

In the lock screen mode, on the region other than the directional pattern P that occupies most of the display screen, the user is allowed to directly enter the main screen mode through such a sliding touch (S2, S3, S4, or S5) and easily enter the main screen mode. Even when the unlock mobile application software capable of survey is installed, the user often wants to rapidly enter the main screen mode without participating in the survey. At this point, the user can unlock and enter the main screen mode through a soft sliding touch (S2, S3, S4, or S5).

Figure 10:
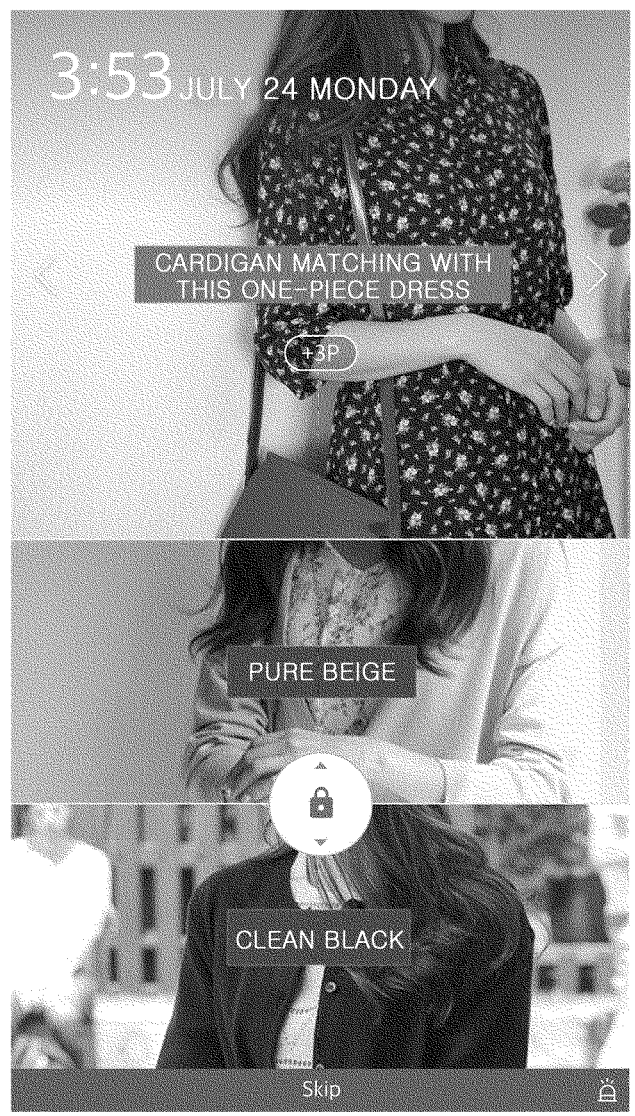
FIG. 10 is a drawing of illustrating an up-and-down two-part split lock screen of a second split screen, which is different from that of FIG. 2.
Figure 11:
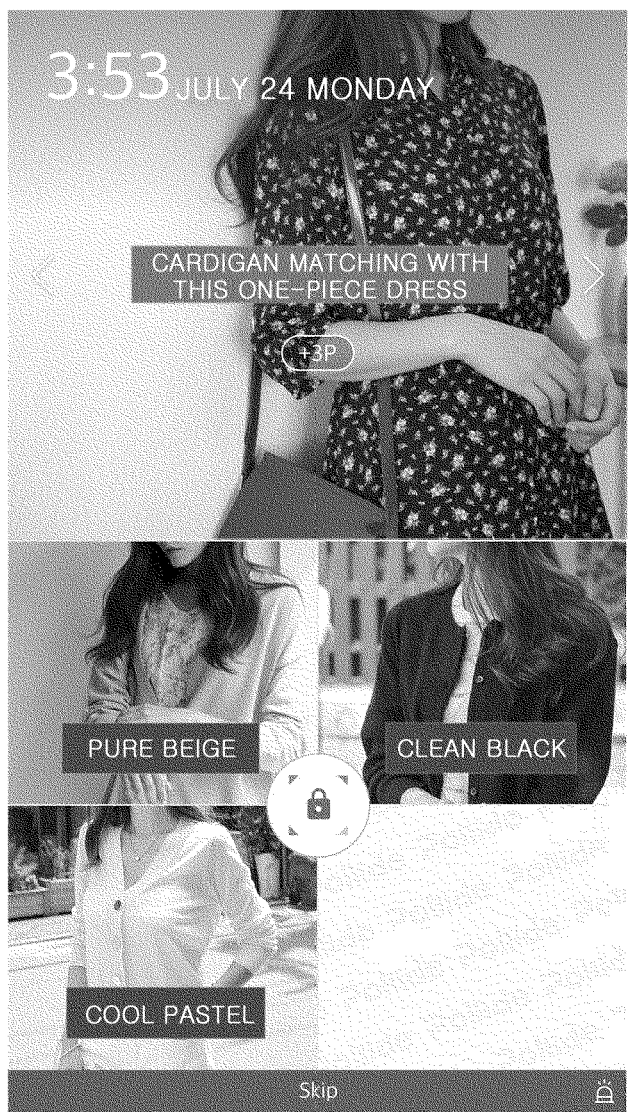
FIG. 11 is a drawing of illustrating a three-part split lock screen of a second split screen as an embodiment of the present invention.
Figure 12:
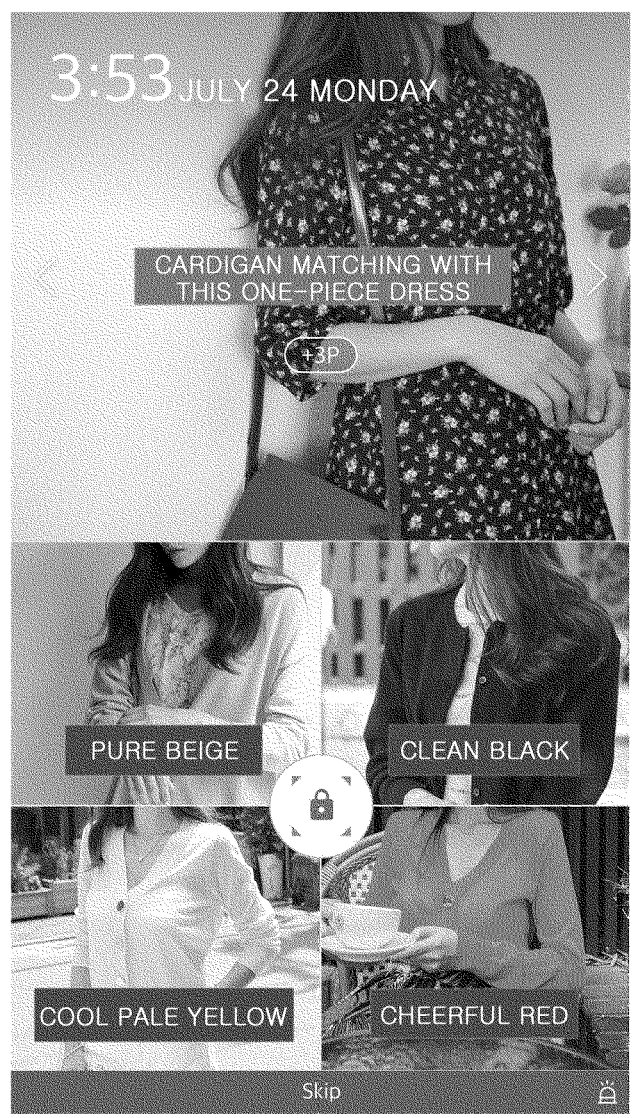
FIG. 12 is a drawing of illustrating a four-part split lock screen of a second split screen as an embodiment of the present invention.
Figure 13:
FIG. 13 is a drawing of illustrating a four-part split lock screen of the second split screen, which is different from that of FIG. 12 as an embodiment of the present invention.

FIG. 10 is a drawing of illustrating an up-and-down two-part split lock screen of a second split screen 200, which is different from that of FIG. 2, FIG. 11 is a drawing of illustrating a three-part split lock screen of a second split screen 200 as an embodiment of the present invention, FIG. 12 is a drawing of illustrating a four-part split lock screen of the second split screen 200 as an embodiment of the present invention, and FIG. 13 is a drawing of illustrating a four-part split lock screen of the second split screen 200, which is different from different from that of FIG. 12 as an embodiment of the present invention.

As seen in FIGS. 10 to 13, the answer content A to the survey content Q may be various from two choices to four choices, and an answer screen including the answer content A according thereto may be split in various manners from two-part split screens to four-part split screens. FIG. 10 illustrates the second split screen 200 different from FIG. 2. In FIG. 2, the second screen 200 is split and divided side by side, but in FIG. 10, the second screen 200 is split and divided up and down.

FIG. 11 shows an answer screen for three choices, and it may be checked that only three arrows are activated in order to correspond to the directional pattern P or three answer screens.

FIGS. 12 and 13 show that screens are split in a different manner as an answer screen for four choices.

Besides, more number of answer screens may exist. For example, answer content A having five choices or six choices, etc., may exist, and the number of answer screens may be determined according thereto. In addition, as various screen splits exist for four choice content like FIGS. 12 and 13, various screen splits may exist according to the number of answers.

The present invention requires a protection range for a mobile device in which the unlock mobile application software capable of survey is installed. In other words, the present invention requires the protection range for the mobile device in which the unlock mobile application software capable of survey is installed, and which performs operations of displaying the survey content received from the service server through the lock screen mode in communication with the service server though a wireless communication unit, and receiving the gesture input by means of the input means to transmit answer data to the service server.

The mobile device at this point includes the wireless communication unit for communicating with the service server in a wireless manner, a memory for storing data, and a processor, wherein through execution of the unlock mobile application software capable of survey, the processor composes and displays the lock screen mode with a first split screen and a second split screen that is separately divided from the first split screen, displays an answer screen in which survey content is displayed on the first split screen and two or more pieces of answer content matched with the survey content are included on the second split screen, visualizes and displays the directional pattern corresponding to the answer screen, and then controls an operation for entering a main screen mode according to the gesture event of the user.

Operations of the processor thereafter and other various configurations are disclosed in the above-described user interface method capable of survey, and thus detailed descriptions thereabout will be omitted.

The scope of the disclosed technology is not limited to the clearly described Examples which are disclosed above. Moreover, it should be understood that the scope of the disclosed technology cannot be limited by modifications or substitutions that are obvious in the technical field.

M: MARK
Q: SURVEY CONTENT
A: ANSWER CONTENT
P: DIRECTIONAL PATTERN
S1: GESTURE EVENT

T1, T2: TOUCH EVENT
S1, S2, S3, S4: SLIDING TOUCH
100: FIRST SPLIT SCREEN
200: SECOND SPLIT SCREEN
300: THIRD SPLIT SCREEN

The invention claimed is:

1. A user interface method capable of survey, when a lock screen mode is switched to a main screen mode in a mobile device in which an unlock mobile application software capable of survey is installed, the user interface method capable of survey comprises:
 a step of entering the main screen mode, when an input means of the mobile device generates a gesture event corresponding to a directional pattern on a second split screen,
 wherein the lock screen mode comprises a first split screen and a second split screen separately divided from the first split screen, survey content is displayed on the first split screen, and two or more answer screens, each of which comprises answer content matched with the survey content, and the directional pattern corresponding to the answer screens is defined and visualized on the second split screen,
 wherein before entering the main screen mode, the mobile device is characterized by displaying a cumulative answer result during a preset time, when generating the gesture event.

2. The user interface method capable of survey of claim 1, wherein the cumulative answer result is characterized by being derived in real time through a process in which the mobile device extracts answer data corresponding to the gesture event to transmit the answer data to a service server, and
 the service server accumulates the answer data received from a plurality of mobile devices.

3. The user interface method capable of survey of claim 1, wherein the mobile device is characterized by changing a plurality number of pieces of survey content and answer content matched with the survey content received from a service server according to a time interval or an answer event occurring in the mobile device to display the changed plurality of pieces of survey content and answer content respectively on the first split screen and the second split screen.

4. The user interface method capable of survey of claim 1, wherein a mark, which is capable of changing the survey content and the answer content matched therewith, is defined and visualized on the first split screen, and
 the mobile device is characterized by changing the survey content and a plurality number of pieces of survey content received from a service server, every time the input means generates a touch event for touching the mark, and displaying the changed plurality number of pieces of survey content and answer content respectively on the first split screen and the second split screen.

5. The user interface method capable of survey of claim 1, wherein the gesture event is characterized by that the input means slide-touches the directional pattern to any one answer screen among two or more of the answer screens.

6. The user interface method capable of survey of claim 1, wherein the mobile device is characterized by displaying an image corresponding to the survey content on the first split screen together with the survey content or displaying an image corresponding to the answer content on the answer screen together with the answer content.

7. The user interface method capable of survey of claim 1, wherein the lock screen mode further comprising:
 a third split screen separately divided from the first split screen and the second split screen,
 wherein the mobile device switches the lock screen mode to the main screen mode, when the input means generates a touch event for touching the third split screen.

8. The user interface method capable of survey of claim 1, wherein the mobile device is characterized by switching the lock screen mode to the main screen mode, when the input means generates a sliding touch event in a region other than the directional pattern of the lock screen mode.

9. A mobile device, in which an unlock mobile application software capable of survey is installed and which displays survey content received in communication with a service server via a wireless communication unit through a lock screen mode and performs an operation of receiving a gesture event input through an input means to transmit answer data to the service server, the mobile device comprising:
 a memory for storing data; and
 a processor,
 wherein the processor is characterized by performing through execution of the unlock mobile application software capable of survey:
 (a) an operation of composing the lock screen mode with a first split screen and a second split screen separately divided from the first split screen, displaying survey content is displayed on the first split screen, and visualizing two or more answer screens comprising answer content matched with the survey content on the second split screen, and a directional pattern corresponding to the answer screens; and
 (b) an operation of controlling to enter a main screen mode, when an input means of the mobile device generates a gesture event corresponding to the directional pattern on the second split screen,
 wherein the processor further performs an operation of displaying a cumulative answer result during a preset time at a time of generating the gesture event, before entering the main screen mode.

10. The mobile device of claim 9, wherein the cumulative answer result is characterized by being derived in real time through a process that the mobile device extracts answer data corresponding to the gesture event to transmit the answer data to a service server, and the service server accumulates the answer data received from a plurality of mobile devices.

11. The mobile device of claim 9, wherein the (a) operation comprises changing a plurality of pieces of survey content and answer content matched with the survey content received from a service server according to a time interval or an answer event occurring in the mobile device to display the changed plurality of pieces of survey content and answer content respectively on the first split screen and the second split screen.

12. The mobile device of claim 9, wherein the (a) operation is characterized by defining to visualize a mark capable of changing the survey content and the answer content on the first split screen, and
 changing a plurality number of pieces of survey content received from a service server and answer content matched with the survey content, every time the input means generates a touch event for touching the mark, to display the changed plurality of pieces of survey content and answer content respectively on the first split screen and the second split screen.

13. The mobile device of claim 9, wherein the gesture event is characterized by that the input means slide-touches any one among the two or more answer screens, starting from the directional pattern.

14. The mobile device of claim 9, wherein the (a) operation is characterized by displaying an image corresponding to the survey content on the first split screen together with the survey content or displaying an image corresponding to the answer content on the answer screen together with the answer content.

15. The mobile device of claim 9, wherein the lock screen mode further comprises a third split screen separately divided from the first split screen and the second split screen, and the processor performs, after the (a) operation, an operation of controlling to enter the main screen mode, when the input means generates a touch event for touching the third split screen.

16. The mobile device of claim 9, wherein the processor is characterized by controlling to enter the main screen mode, when the input means generates a sliding touch event in a region other than the directional pattern of the lock screen mode.

\* \* \* \* \*